(12) United States Patent
Hanko et al.

(10) Patent No.: US 11,002,703 B2
(45) Date of Patent: May 11, 2021

(54) ELECTROCHEMICAL HALF CELL AND METHOD FOR THE PRODUCTION OF A HALF CELL

(71) Applicant: Endress + Hauser Conducta Gesellschaft für Mess- und Regeltechnik mbH + Co. KG, Gerlingen (DE)

(72) Inventors: Michael Hanko, Dresden (DE); Magdalena Losik, Dresden (DE); Jens Vettermann, Grossweitzschen (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 524 days.

(21) Appl. No.: 14/971,063

(22) Filed: Dec. 16, 2015

(65) Prior Publication Data

US 2016/0178556 A1 Jun. 23, 2016

(30) Foreign Application Priority Data

Dec. 22, 2014 (DE) ...................... 10 2014 119 449.7

(51) Int. Cl.
*G01N 27/30* (2006.01)

(52) U.S. Cl.
CPC .................................. *G01N 27/30* (2013.01)

(58) Field of Classification Search
CPC ............................................. G01N 27/30–401
See application file for complete search history.

(56) References Cited

U.S. PATENT DOCUMENTS

| 4,959,138 A * | 9/1990 | Brinkmann | ............. | G01N 27/30 |
| | | | | 204/401 |
| 2005/0133369 A1* | 6/2005 | Sovrano | ............. | G01N 27/4035 |
| | | | | 204/435 |
| 2013/0161191 A1* | 6/2013 | Wilhelm | ............. | G01N 27/301 |
| | | | | 204/406 |
| 2013/0270125 A1* | 10/2013 | Lobbert | ............. | G01N 27/4163 |
| | | | | 205/793 |
| 2014/0034515 A1* | 2/2014 | Thrier | ................. | G01N 27/301 |
| | | | | 205/787.5 |
| 2016/0178556 A1 | 6/2016 | Hanko et al. | | |

FOREIGN PATENT DOCUMENTS

| DE | 939597 C | * | 2/1956 |
| DE | 3100302 A1 | | 12/1981 |
| DE | 3405431 A1 | | 3/1985 |
| DE | 102014119449 A1 | | 6/2016 |

OTHER PUBLICATIONS

Kratz (DE 939597, machine translation).*
Kratz et al. (DE 939597 C, Human Translation) (Year: 1956).*
Search Report for German Patent Application No. 10 2014 119 449.7, German Patent Office, dated Dec. 18, 2015, 6 pp.

* cited by examiner

*Primary Examiner* — Maris R Kessel
*Assistant Examiner* — Joshua L Allen
(74) *Attorney, Agent, or Firm* — Mark A. Logan; Endress+Hauser (USA) Holding Inc.

(57) ABSTRACT

The disclosure includes an electrochemical half-cell including: a housing; a potential sensing element at least arranged on some segments inside the housing and connected electroconductively with an electrical contact point outside the housing; and an electrolyte arranged inside the housing, wherein a plurality of hollow bodies is embedded in the electrolyte, especially distributed evenly inside the volume filled by the electrolyte.

23 Claims, 4 Drawing Sheets

ELECTROCHEMICAL HALF CELL AND METHOD FOR THE PRODUCTION OF A HALF CELL

Figure 1:
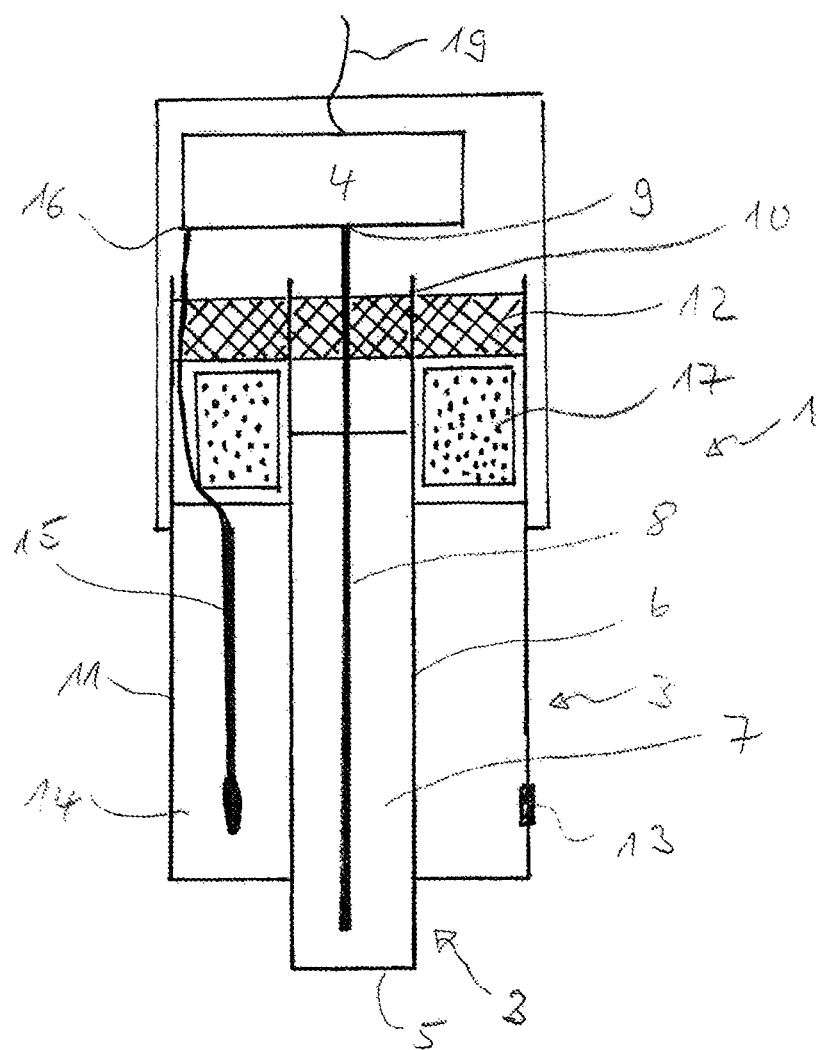

The invention concerns an electrochemical half cell and a method for the production of a half cell. This type of half cell is used for various kinds of electrochemical sensors.

Electrochemical sensors are widely used in laboratory and process metrology in many areas of chemistry, biochemistry, pharmacy, biotechnology, food technology, water management and environmental metrology in the analysis of measuring media, especially measuring fluids. By means of electrochemical measuring methods, the activities by chemical substances, e.g. ion activity and measurands in liquids correlated to them can be captured. The substance whose concentration of activity is to be measured is also referred to as an analyte. Electrochemical sensors of this type may, for example, be potentiometric or amperometric sensors.

Potentiometric sensors usually comprise a measuring half cell and a reference half cell as well as a measuring circuit. The measuring half cell develops a potential that depends on the concentration or activity of the analyte in the measuring medium when in contact with the measuring medium, e.g. a measuring fluid, while the reference half cell provides a stable reference potential that is independent from the concentration of the analyte. The measuring circuit generates a measuring signal that represents the potential difference between the measuring half cell and the reference half cell. The measuring signal outputs the measuring signal to a unit connected with the sensor, if required, e.g. with a measuring transducer, which then continues to process the measuring signal.

The reference half cell of potentiometric sensors comprises a reference element that is in contact with a reference electrolyte. The reference electrolyte is found in a chamber within the housing of the reference half cell. In order to conduct a potentiometric measurement, the reference electrolyte must be in electrolytic contact with the measuring medium. This contact is provided by an electrochemical junction, in particular a liquid junction, that may, for example, consist of a through bore in the housing wall, a porous diaphragm or a gap. The potential in the reference half cell is defined by the reference electrolyte and the reference element. If the reference half cell is, for example, designed as a silver/silver chloride reference electrode, the reference electrolyte is an aqueous solution with a high concentration of chloride, usually a 3-molar potassium chloride, and the reference element is a silver wire coated with silver chloride. The reference element is connected to the measuring circuit mentioned above in an electrically conductive manner. The reference electrolyte may be thickened by adding a thickening agent, especially a polymer. Due to the strong interlinking of the added polymer, the reference electrolyte is solidified, which makes the electrolyte not fluid anymore, and it cannot escape from the housing via the electrochemical junction.

The measuring half cell comprises a potential-forming element which may comprise, for example, a redox electrode, an analyte-sensitive coating or an ion-selective membrane, depending on the type of potentiometric sensor. Examples for potential-forming elements with an ion-selective membrane are ion-selective electrodes (ISE). An ion-selective electrode features a housing that is closed by an ion-selective membrane serving as the potential-forming element. The housing contains an electrolyte fill. The ion-selective electrode also comprises a potential sensing element that is in contact with the inner electrolyte. If the measuring medium is in contact with the potential-forming element, a modification in the activity and/or concentration of the analyte in the measuring medium causes a relative change of the balance Galvani voltage between the measuring medium and the measuring fluid in contact with the potential-forming element via the inner electrolyte, and the potential sensing element. The potential sensing element is connected with the measure arrangement in an electrically conductive manner. A special case of such an ion-selective electrode is the known pH glass electrode, which has a chamber closed by a pH-sensitive glass membrane including an inner electrolyte comprising a buffer system to adjust a stable pH value, and a potential sensing element that is immersed in it. Ion-selective electrodes have been described, for example, in "Das Arbeiten mit ionenselektiven Elektroden [Working with ion-selective electrodes]" K. Cammann, H. Galster, Springer, 1996.

Amperometric measuring devices may, for example, comprise a three electrode arrangement whit a working electrode, a counter electrode and a reference electrode that is not on a current. Such a measuring device may, for example, have a regulation circuit, especially a potentiostatic one, that is arranged to set a nominal voltage between the working electrode and the reference electrode and to capture the current flowing between the working electrode and the counter electrode in this case. The reference electrode without current, here and in the following also referred to as a reference half cell, may be designed in the same way as a reference half cell in a potentiometric measure arrangement, especially of an electrode of the second type.

When such sensors are applied in n process metrology to monitor electrochemical measurands, especially the concentration or activity of an analyte, or of the pH value in a measuring medium, the sensors are often exposed to temperature changes. For example, it may be required for a number of processes in food technology or pharmacy to regularly clean or sterilize the sensors at higher temperatures. In order to avoid the sensors bursting due to temperature and/or pressure fluctuations, a gas volume must be available inside the housing that compensates for the thermal expansion of an inner and/or reference electrolyte in a half cell. This volume is also referred to as compensation volume.

Usually, porous elastic solid bodies, e.g. mainly closed-pore neoprene or silicon foams are used as compensators for changes in the volume occupied by the inner or reference electrolyte in the sensor housing. In case of sensors shaped as rods, e.g. single rod measuring cells, those compensators are often arranged in a rear area of the housing, i.e. one that is not facing the sensitive element. If the electrolyte has been thickened to a great extent, rendering it only poorly fluid or even totally immobile, the thermal activity of the electrolyte in such an arrangement may lead to breaks and an internal interruption of the electrolyte. Another disadvantage in the use of porous elastic solid bodies as compensators is the fact that it is rather time-consuming and difficult to automatize the process of introducing the solid body into the sensor housing. In addition, there is a risk of polluting the inside of the housing when the compensators are introduced, especially of the electrolyte or adhesive areas.

It is therefore the object of the invention to describe an electrochemical half cell and a method for its production that avoid the disadvantages listed.

This object is completed by an electrochemical half cell according to claim 1, a sensor according to claim 11 and a method to produce a half cell according to claim 12. Advantageous embodiments are listed in the dependent claims.

The electrochemical half cell according to the invention comprises:
- a housing;
- a potential sensing element at least arranged on some segments inside the housing that is connected electroconductively with an electrical contact point outside the housing;
- an electrolyte arranged inside the housing, wherein a plurality of hollow bodies is closed in the electrolyte, especially distributed evenly inside the volume filled by the electrolyte.

Instead of a compensation volume arrange outside of the volume filled by the electrolyte, e.g. a compensator formed by a porous solid body, it therefore provides a plurality of compensation volumes in the form of hollow bodies distributed mainly evenly inside the volume filled by the electrolyte. Due to the even distribution of the compensation volumes, an internal interruption of the thickened or solidified electrolyte due to thermal activity is avoided. Introducing the hollow bodies may be done completely during the manufacture of the half cell before, at the moment of, or after the introduction of the electrolyte into the housing during the production of the half cell, in order to completely eliminate the required additional work processes for the introduction of closed-pore or foam solid bodies as compensators according to the state of the art, while at the same time avoiding or at least drastically reducing the risk of pollution of the housing interior of the half cell.

A hollow body is to be understood here and in the following paragraphs as a body, preferably compressible, that comprises a wall encompassing a gas-filled space. The wall of the hollow body is preferably elastic and largely impenetrable for electrolytes surrounding the wall, especially for the electrolyte of the half cell according to the invention.

The potential sensing element may be in direct contact with the electrolyte, i.e. touch it or directly contact a second electrolyte found in a protective tube arranged inside the housing, with the second electrolyte in turn being in electrolytic contact with the electrolyte, e.g. by means of a junction. The second electrolyte may be in contact with the electrolyte via a diaphragm that serves to exchange load carriers such as ions.

The half cell may be a reference half cell or a measuring half cell of a potentiometric sensor. The half cell may also be a reference half cell of an amperometric sensor. The potential sensing element serves for electrical contacting the half cell by a measuring circuit that may be or is connected with the potential sensing element via the contact point arranged outside the housing in an electrically conductive way. If the half cell is part of a potentiometric sensor, the measure arrangement serves to capture a potential difference between the half cell and another half cell or, to be more precise, between the potential sensing element of the half cell and a potential sensing element of the additional half cell. If the half cell is part of an amperometric sensor that has a working electrode and a counter electrode in addition to the half cell serving as the reference electrode, the measure arrangement serves to provide a nominal voltage and a nominal voltage curve between the working electrode and the reference electrode and to capture at the same time the electrical current running between the working electrode and the counter electrode.

The hollow bodies may, in an advantageous embodiment, be evenly distributed across the volume taken up by the electrolyte. The volume taken up in total by the hollow bodies may be between 5 and 50%, preferably between 5 and 20%, and particularly preferred between 5 and 10% of the total volume taken up by the electrolyte and the hollow bodies embedded in it.

The hollow bodies contained in the reference half cell may have a size distribution of such a type that the maximum outer diameter of all hollow bodies are within a tolerance range from ±5 to ±30%, preferably from ±5 to ±15%, of an average value for the maximum outer diameter of all hollow bodies around this average value. The average value of the maximum outer diameter may be a value between 10 nm and 1 mm. The average of the maximum outer diameter may also be between 500 nm to 500 µm, or between 1 µm and 100 µm, or even between 10 µm and 70 µm. The hollow bodies may have a spherical shape, or alternatively any other geometrical shape. The outer diameter of a hollow bodies is the linear connection between two points on the outer surface of the wall of the hollow body that runs through its center of gravity. The maximum outer diameter is the longest possible connection of this type.

The electrolyte may be a solution thickened or solidified by means of a thickening agent, especially a polymer that comprises at least one electrolyte salt.

A solidified electrolyte is understood to be an electrolyte comprising a polymer, wherein the interlinking level of the polymer is at such a degree that the electrolyte is no longer fluid, especially firm or gelled. Such an immobilization may, for example, be achieved by using one or several of the following polymer additives: Agar-agar, gelatin, interlinked polyacrylate, interlinked polyacrilamide, interlinked polyvinyl alcohols or an interlinked co-polymer based on diallyldimethylammonium chloride. A thickened electrolyte may also include such a polymer whose degree of interlinking, however, is lower, resulting in the electrolyte having a higher viscosity than water, but still being fluid. The share of the polymer in the electrolyte may be between 3 and 30% in weight.

As electrolyte salt, the electrolyte may, for example, comprise a halide salt, especially potassium chloride. Advantageously, the electrolyte contains the halide salt in a high concentration, especially a concentration of 3 mol/l. Additionally or alternatively, the electrolyte may include a pH buffer system. A pH buffer system includes at least one weak acid and its corresponding base or a weak base and its corresponding acid and serves to stabilize the pH value of the electrolyte. An electrolyte comprising such a pH buffer system is also referred to as buffer solution, or in short, as a buffer.

The electrolyte may be obtained by introducing an electrolyte solution containing monomers, especially thickened by an additive, as well as a plurality of hollow bodies into the housing and by polymerization of the monomers in the housing in order to create a viscous and/or firm electrolyte.

The electrolyte may, especially if it is a half cell that is the reference half cell of a potentiometric sensor, be a bridging electrolyte that is in contact with another electrolyte, especially with one comprising a given concentration of halide.

The hollow bodies may have an elastic wall encompassing a gas-filled volume, with the wall consisting, for example, of an acrylonitrile polymer or a resin. The wall may also be made of a different elastic material, especially a polymer.

The housing may comprise an electrochemical junction arranged in one housing wall, which allows the electrolyte to be in electrolytic contact with a medium found outside the housing.

The housing may be closed by means of an adhesive layer or with a separation layer, e.g. designed as a pane, wherein the volume filled by the electrolyte preferably immediately borders on the adhesive layer. The separation layer may be linked to one housing wall of the housing by adhesion, or be fused to it.

The invention also concerns an electrochemical sensor comprising a half cell according to one of the embodiments described above. In addition to the half cell, the sensor may comprise at least one further half cell as well as a measure arrangement that is in electrically conductive connection with the potential sensing element of the half cell and a potential sensing element of the further half cell. The measure arrangement may, as mentioned above, serve to capture a potential difference between the half cells or to adjust a nominal voltage between the half cell and another half cell or electrode and for capturing a current running between the further half cell or electrode and a counter electrode, depending on the type of sensor. The measure arrangement may further be designed to generate a measuring signal representing the measurand from the measurand captured, i.e. the potential difference of the amperage of the current running between the further half cell and the counter electrode, and, if required, to further process it, e.g. to digitalize it and to output the measuring signal or a processed measuring signal to a superior unit. The superior unit may, for example, be a measuring transducer, a computer, a programmable logic controller or a process control computer.

The method according to the invention to produce a half cell comprises the steps:
provision of a housing;
introduction of an electrolyte solution and a plurality of hollow bodies into the housing; and
introduction of at least one section of a potential sensing element into the housing.

The electrolyte solution may comprise a thickening agent.

In one advantageous variation of the method, the electrolyte solution may already be thickened by the thickening agent when being introduced into the housing that the electrolyte solution is still fluid, but has a viscosity and a density that is measured in such a way that the hollow bodies do not settle in the electrolyte solution and/or float, but are suspended in homogeneous distribution in the electrolyte introduced into the housing.

The electrolyte solution may alternatively include one or several polymerizable monomers and/or an interlinkable pre-polymer as a thickening agent. After the electrolyte solution has been introduced into the housing, they may be polymerized and/or linked in a further process step.

In this alternative embodiment, the process further comprises the step:
thickening or solidifying the electrolyte solution contained in the housing, especially by heating and/or irradiating the electrolyte solution until a thickened, but still fluid or a solidified electrolyte is formed of the electrolyte solution into which the hollow bodies are embedded.

If the electrolyte solution comprises an interlinkable pre-polymer, the thickening or solidifying of the electrolyte solution may occur by interlinking the pre-polymer, wherein the thickening or solidifying includes heating and/or irradiating the electrolyte solution and adding a crosslinker to the electrolyte solution.

If the electrolyte solution comprises one or several polymerizable monomers, the thickening or solidifying of the electrolyte solution by polymerization may occur, wherein the thickening or solidifying includes heating and/or irradiating the electrolyte solution and adding an initiator to the electrolyte solution.

The electrolyte solution to be introduced into the housing may advantageously already be thickened by means of an additive. This offers the advantage of the hollow bodies that have been introduced into the electrolyte solution and are possibly being submerged in it not depositing as quickly when the solution is still. On the one hand, this is achieved by the buoyancy the hollow bodies experience in the electrolyte solution, on the other by the Stokes friction that depends on the viscosity of the electrolyte solution.

It is advantageous to adjust viscosity and/or density of the electrolyte solution by means of the additive to mass and geometry, especially to the diameter, of the hollow bodies in such a way that their sedimentation and/or flotation velocity in the electrolyte solution is so low as to make the hollow bodies not, or not substantially sink or float and/or flotate during the reaction serving to thicken or solidify the electrolyte solution.

Once the electrolyte solution has been added and/or after thickening or solidifying it, an adhesive layer or separation layer may be applied directly onto the electrolyte that has been introduced or thickened or solidified in the housing. Through this layer, an electrically conductive connection of the potential sensing element with an electrical contact point arranged outside the housing is led.

Figure 2:
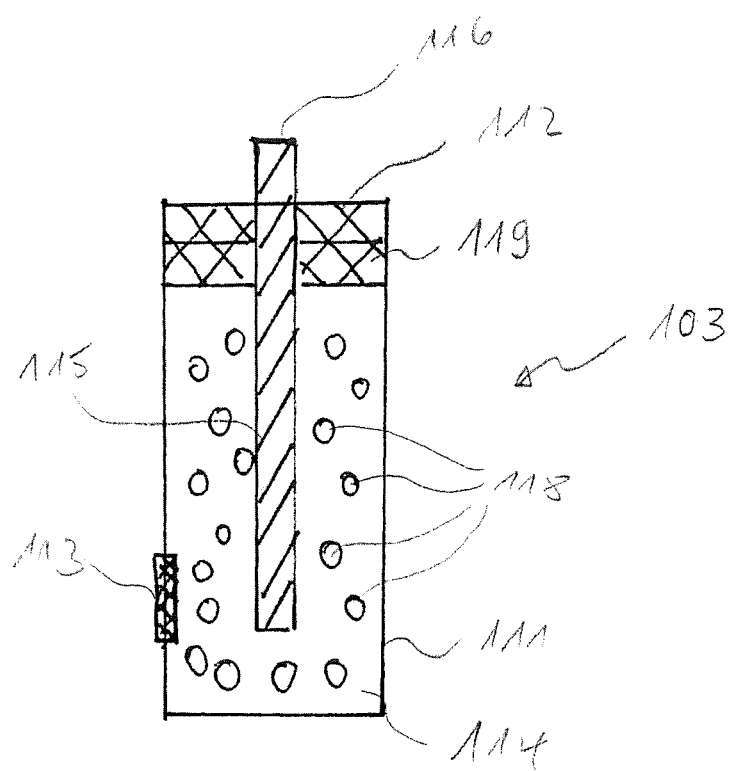
Figure 3:
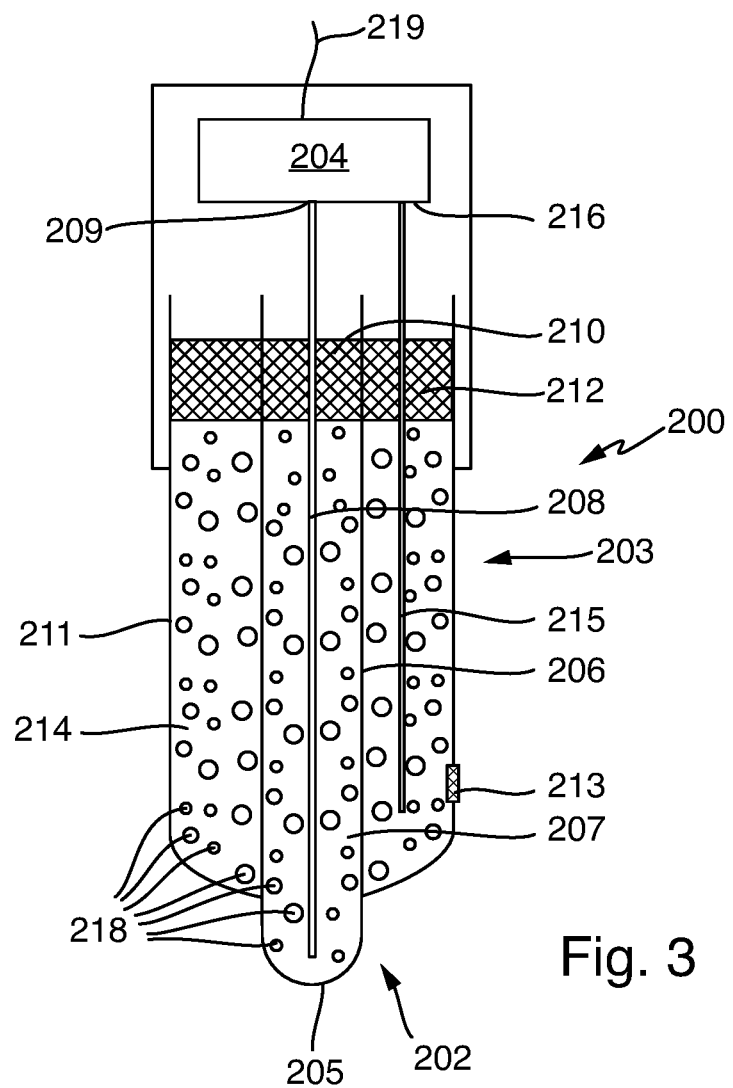
Figure 4:
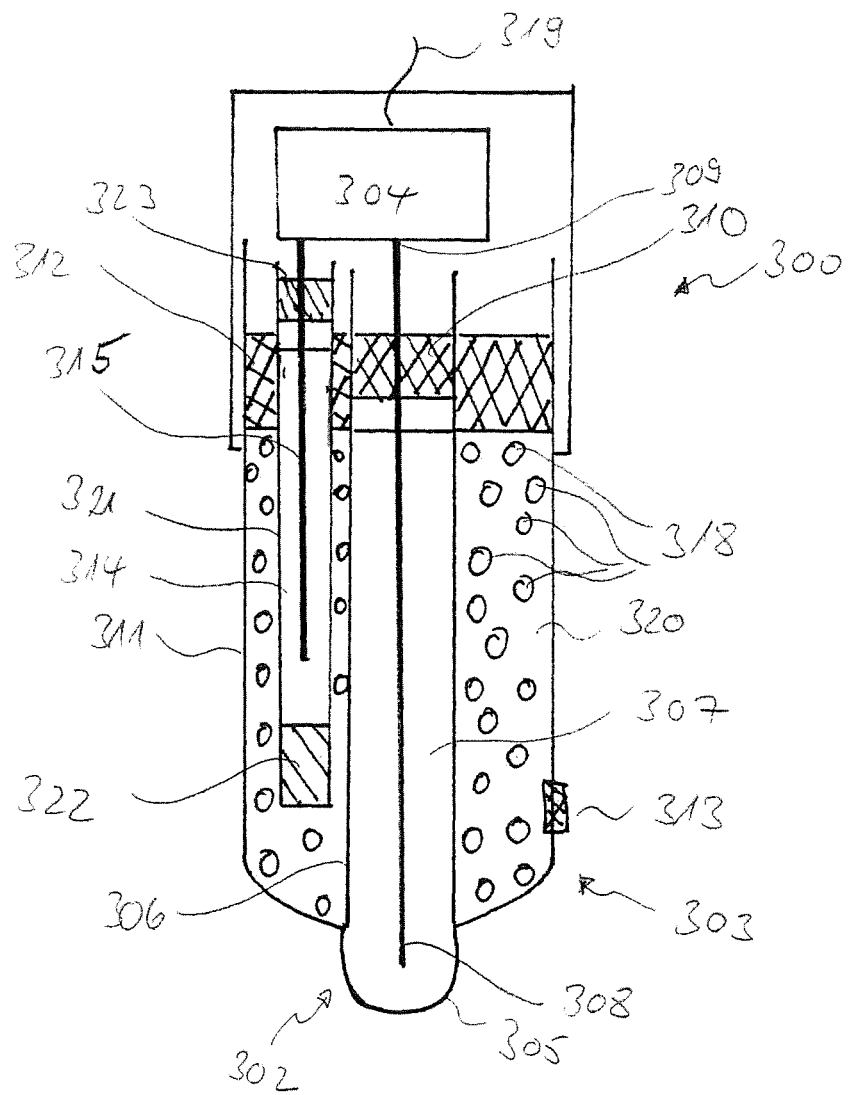

The invention is in the following explained in detail on the basis of the embodiments shown in the illustrations. They show:

FIG. 1 a schematic drawing of a potentiometric sensor according to the state of the art;

FIG. 2 a schematic view of an electrochemical half cell according to the invention;

FIG. 3 a schematic view of a potentiometric pH sensor with a reference half cell that comprises a reference electrolyte with embedded hollow bodies;

FIG. 4 a schematic view of a potentiometric pH sensor with a reference half cell that comprises an immobilized bridging electrolyte with embedded hollow bodies.

FIG. 1 shows a potentiometric sensor 1 according to the state of the art in a schematic longitudinal profile. Sensor 1 comprises a measuring half cell 2 and a reference half cell 3 as well as a measure arrangement 4 that is designed to capture a potential difference between the measuring half cell 2 and the reference half cell 3. The sensor 1 is designed as a rod-shaped measuring probe whose front end is intended to be immersed into a measuring medium.

The measuring half cell 2 features an analyte-sensitive membrane 5, in this example an ion-selective membrane. It closes an interior pipe 6 of the sensor 1 at its front end. The housing created by the interior pipe 6 contains an inner electrolyte 7. In this example, the inner electrolyte 7 is an aqueous solution that contains a given concentration of the analyte whose concentration in the mass medium is to be monitored with the sensor 1. A potential sensing element 8 is immersed in the inner electrolyte 7, with the former being connected outside the housing of the measuring half cell 2 formed by the interior pipe 6 with the measure arrangement 4 via a contact point 9. At the rear end not facing the analyte-sensitive membrane 5, the interior pipe 6 is closed tightly against liquids by bonding 10.

The reference half cell 3 comprises a ring-shaped housing that is formed between the interior pipe 6 and an exterior pipe 11 that runs concentrically around the interior pipe 6. At its rear end, this is also closed by adhesive bonding 12. In the outer housing wall, i.e. in the exterior pipe 11, a diaphragm 13 serving as an electrochemical junction is arranged. It may, for example, be formed by a porous solid body. The housing of the reference half cell 3 contains a reference electrolyte 14 that is solidified by adding a polymer and comprises a given halide concentration. The polymer is interlinked to such a high degree that the reference electrolyte is no longer fluid. The reference electrolyte 14 is contacted by a potential sensing element 15 that simultaneously serves as the reference element of the reference half cell. The potential sensing element 15 in this example is made of a silver wire that has a silver chloride layer in its front end area. Its rear end is led outside the housing through the adhesion 12 and connected to the measure arrangement 4 via a contact point 16.

In order to conduct a measuring of an analyte concentration in a measuring medium, the front end area of the sensor 1 is immersed into the measuring medium to such a degree that both the membrane 5 and the diaphragm 13 are in contact with the measuring medium. The measure arrangement 4 is designed to capture a potential difference between the potential sensing element 8 of the measuring half cell 2 and the potential sensing element 15 of the reference half cell 3 and output a respective measuring signal to a superior unit via an interface 19. The potential difference that can be captured between the potential sensing elements 8 and 15 depends on the analyte concentration in the measuring medium, which means that the measuring signal output by the measure arrangement 4 represents the analyte concentration of a measurand that depends on the analyte concentration.

As mentioned before, modifications in the volume of the reference electrolyte 14 may be compensated by means of compensators 17 that are arranged in the housing of the reference half cell 3 in a space above the volume filled by the reference electrolyte 14. In this example, a single, ring-shaped compensator 17 made of an elastic, closed-pore material, e.g. neoprene or a closed-pore silicon foam is provided. Changes in volume of the reference electrolyte 14 due to temperature changes are compensated by respective volume changes of the compensator 17.

The compensation of volume changes in the reference electrolyte 14 by means of compensators 17 designed as solid bodies does, however, have a number of disadvantages: Firstly, there may be electrostatic charging on the surface of the compensator 17 during operation which affect measuring quality. Secondly, the introduction of one or several compensators 17 into the housing is difficult to automate. There is furthermore the risk of contaminating the housing in the process of introducing the compensators, especially the areas intended for adhesion 12, which in turn may lead to insufficient tightness of the adhesion 12. And finally, the arrangement with a compensator above the space filled by the reference electrolyte in the housing is not ideal during sensor 1 operation either, especially in sensors with a long shaft, which may lead to an interruption of the reference electrolyte 14 during operation.

In FIG. 2, a half cell 103 according to the invention is represented in a schematic view which should avoid or at least drastically reduce such problems. The half cell 103 has a housing 111 made of an electrically insulating material, e.g. glass, that contains an electrolyte 114 solidified by an interlinked polymer. In this example, the half cell 103 is designed as a reference half cell that may, for example, be used in a measure arrangement functioning on a potentiometric or amperometric measuring principle. The reference half cell 103 is designed as a silver/silver-chloride electrode. It is evident that the reference half cell may also be realized as another reference electrode of the second type in a completely analogue way. The reference electrolyte 114 comprises a high concentration of a halide salt, in this case a 3-molar potassium chloride solution. A diaphragm 113 arranged on the wall of the housing 111 which may, for example, be made of a porous ceramic body, creates an electrolytic contact between the reference electrolyte 114 and a measuring medium arranged outside of the housing. The front end of the housing is then dipped into the measuring medium during a measurement of the analyte concentration in said measuring medium at least to the extent that the diaphragm 113 is completely immersed into the measuring medium.

A potential sensing element 115 is immersed in the reference electrolyte 114, with the former in this example being made of a silver wire that has a silver-chloride layer at least in its end area.

The potential sensing element 115 is led outside the housing through an adhesive layer 112 that closes the rear of said housing. It is connected with a contact point 116 at which a measure arrangement can electrically contact the potential sensing element.

The reference electrolyte 114 includes a polymer that is interlinked to such a high degree that the reference electrolyte is solidified, especially firm. In this example, the polymer may consist of the monomers acrylamide and bisacrylamide. A plurality of hollow bodies 118 is embedded into the reference electrolytes 114 which are mainly designed as hollow spheres in this example. However, other geometries are conceivable, especially shapes of hollow cylinders, or hollow, rotational ellipsoids. The hollow bodies 118 are immobilized in the solidified reference electrolyte 114 and generally distributed evenly to prevent them from depositing on the floor of the half cell or buoying due to the force of gravity. The hollow bodies 118 have a wall that surrounds a gas-filled hollow space, in this example made of an acrylonitrile polymer. When a pressure or temperature applies, the housing of the hollow body 118 can be deformed, which makes the gas volume that is enclosed act as a compensation volume. The hollow bodies 118 thus serve as compensation volumes for volume modifications in the solid components of the reference electrolyte 114 occurring due to temperature fluctuations. The adhesive layer 112 rests upon a separation layer 119 that is applied to the solidified reference electrolyte 114. Since the hollow bodies 118 contained in the reference electrolyte 114 are compressible, no additional compensators are required inside the housing. Consequently, the disadvantages of the state of the art as described in connection with FIG. 1 do not apply.

The half cell 103 may be part of a potentiometric measuring set-up that further comprises a measuring half cell and a measure arrangement. The measure arrangement in the potentiometric measuring set-up is designed to capture the potential difference between the measuring half cell and the reference half cell. The measuring half cell may, for example, comprise an ion-selective membrane or a pH sensitive glass membrane with a potential depending on the concentration of the analyte in the measuring medium occurring in contact with the measuring medium. The measuring half cell may be arranged in a housing not connected with the housing of the half cell 103. Alternatively, the half cell 103 may be part of a combination electrode that is designed in an analogue way to the sensor represented in FIG. 1.

The half cell 103 in another embodiment as a reference electrode may be part of an amperometric measuring set-up which further comprises a working electrode and a counter electrode as well as a measure arrangement in an electrically conductive connection with the reference electrode, the working electrode and the counter electrode. For measuring, reference electrode, working electrode and counter electrode are brought into contact with the measuring medium. The measure arrangement in the amperometric measuring set-up may comprise a potentiometric control circuit that is designed to provide a nominal voltage between the working electrode and the current-free reference electrode, and to capture the amperage of the electrical current flowing through the measuring medium when the nominal voltage is set, as well as to generated and output a measuring signal accordingly.

The half cell represented in FIG. 2 may be produced by introducing a 3-molar KCl solution, the polymerizable monomers, such as e.g. acrylamide and bisacrylamide, and an additive that serves to increase the viscosity of the solution into the housing 111. A possible additive might be polyacrylamide. At the same time, adding polyacrylamide increases the density of the electrolyte solution. For example, the proportion of acrylamide and bisacrylamide in the electrolyte solution may be between 0.5 and 10% in weight and the content of polyacrylamide between 0.5 and 5% in weight. Either before the introduction of the solution into the housing 111 or afterwards, a plurality of hollow bodies 118 is introduced into the electrolyte solution and submerged in the electrolyte by stirring. The number of hollow bodies 118 is calculated in order to render the total volume about 3 to 15% of the volume occupied by the electrolyte solution and the hollow bodies 118 together. The volume of the individual hollow bodies, the mass of the individual hollow bodies and the viscosity and/or the density of the electrolyte solution are balanced by the addition of polyacrylamide in such a way that the hollow bodies experience a buoyancy force and/or a Stokes friction in the electrolyte solution which leads to them floating in the electrolyte solution or at least having a very low sink and/or flotation and/or buoyancy speed.

In another step, an initiator for the polymerization of the monomers contained in the electrolyte solution is added to the electrolyte solution. A possible initiator might be a peroxide. The electrolyte solution contained in the housing 111 is heated to approx. 50° C. so as to start the polymerization reaction to generated polyacrylamide. Due to the low sink velocity of the hollow bodies 118 in the electrolyte solution, the polymerization, which at most takes a few hours, is completed before any significant separation of the hollow bodies 118 and the electrolyte can occur. As a result, the hollow bodies 118 therefore remain in an even distribution across the volume occupied by the electrolyte until the electrolyte has solidified at the end of the polymerization process. The result of this process is therefore a solidified, especially firm and not fluid electrolyte with evenly distributed hollow bodies 118 embedded in it.

In an alternative production method, the concentration of the monomers in the electrolyte solution and/or the degree of crosslinking of the polymer resulting from the polymerization in the housing 111 is adjusted in such a way that the electrolyte is thickened, but not completely solidified. The ductility and/or viscosity and/or density of the fluid electrolyte obtained in this way is adjusted so that the sedimentation speed of the hollow bodies 118 in the electrolyte is near zero.

In another alternative production method, hollow bodies 118 are submerged in an electrolyte that is thickened and viscous due to the addition of a gel or polymer. The size and density of the hollow bodies 118 are measured in order to make them float in the electrolyte due to the buoyancy force and/or the Stokes friction they experience in the electrolyte, or that their sedimentation speed is almost zero, or at least slow enough in order to prevent the hollow bodies 118 from depositing even over a period of several weeks. The electrolyte with the hollow spheres may then be introduced into the housing 111.

In order to safely exclude any interruption of the electrical contact between the reference element 115 and a measuring medium found outside the housing due to a hollow body attached to the diaphragm 113, the size of the hollow bodies is preferably selected in such a way that the maximum diameter of each hollow body is much smaller than the diameter of the contact area of the diaphragm 113 with the reference electrolyte 114.

The potential sensing element 116 is preferably introduced into the housing 111 before the electrolyte solution is solidified and/or thickened. After thickening and/or solidifying, the adhesive layer 112 may be applied directly to the electrolyte 114.

FIG. 3 shows a schematic longitudinal section of a potentiometric pH sensor 200. The sensor 200 comprises a measuring half cell 202 and a reference half cell 203 as well as a measure arrangement 204 that is designed to capture a potential difference between the measuring half cell 202 and the reference half cell 203. The pH sensor 200 is designed according to the prior art as a combination electrode like the sensor 1 described in FIG. 1.

The measuring half cell 202 has a pH sensitive glass membrane 205 which closes an interior pipe 206 of the pH sensor 200 at its front end. The housing created by the interior pipe 206 contains an inner electrolyte 207. In this example, the interior electrolyte 207 has been formed by a buffer solution that has been solidified by a polymer and the hollow bodies 218 embedded in it. The potential sensing element 208 is in contact with the inner electrolyte 207, and is connected outside the housing of the measuring half cell 202 formed by the interior pipe 206 with the measure arrangement 204 via a contact point 209. At its rear end facing away from the glass membrane 205, the interior pipe 206 is liquid-tightly closed by means of an adhesive layer 210 directly bordering on the inner electrolyte 207.

The housing of the reference half cell 203 is formed by the interior pipe 206 and the exterior pipe 211 running concentrically around the interior pipe 206. In the outer housing wall, i.e. in the exterior pipe 211, a diaphragm 213 serving as an electrochemical junction is arranged. This may be formed, for example, by an open-pore solid body made of a ceramic or a plastic. The housing of the reference half cell 203 contains a reference electrolyte 214 that is immobilized by adding a polymer and features a given halide concentration, especially 3 mol/l. The polymer is interlinked to such a high degree that the reference electrolyte 214 is not fluid, especially firm or gelled. A plurality of hollow bodies 218 is embedded in the solidified reference electrolyte 214 like in the inner electrolyte 207 of the measuring half cell 202. The reference electrolyte 214 is contacted by a potential sensing element 215 that simultaneously serves as the reference element of the reference half cell 203. The potential sensing element 215 in this example is made of a silver wire that has a silver chloride layer in its front end area. Its rear end is led out of the housing through the adhesive layer 212 that closes the rear end of the housing of the reference half cell 203 and bordering directly on the reference electrolyte 214 and connected to the measure arrangement 204 via a contact point 216.

The measure arrangement 204 is designed to capture a potential difference between the potential sensing element 208 of the measuring half cell 202 and the potential sensing element 215 of the reference half cell 203 and output a respective measuring signal to a superior unit via an interface 219.

The measuring half cell 202 with the inner electrolyte 207 and the reference half cell 203 with the reference electrolyte 214 may be produced in an analogue manner as described for the production of the reference half cell 103 represented in FIG. 2.

FIG. 4 schematically in a longitudinal section view describes a potentiometric pH sensor 300 whose reference half cell 300 comprises a bridging electrolyte 320.

The pH sensor 300 comprises a measuring half cell 302 that includes an inner electrolyte 307 in an interior pipe 306 closed at the front by the pH sensitive glass membrane 305. The inner electrolyte 307 in this example is an aqueous buffer solution without thickening additives. At the back, the interior pipe is closed by adhesion 310, with a gas-filled space being provided between the inner electrolyte 307 and the adhesion 310 to compensate thermal changes in the volume of the inner electrolyte 307. A potential sensing element 308 is immersed in the inner electrolyte 307 which may, for example, be designed as a silver wire. The potential sensing element is led to a contact point 309 though the adhesion 310 that is electrically conductively connected to the measure arrangement 304. Naturally, the measuring half cell 302 could also be equipped like the measuring half cell 202 of the sensor 200 represented in FIG. 3.

The reference half cell 303 of the pH sensor 300 comprises a housing formed by the interior pipe 306 and an exterior pipe 311 concentrically surrounding the interior pipe 306, with said housing comprising a protection pipe 321. The protection pipe 321 has a diaphragm 322 at its front end that is formed of an open-pore solid body, e.g. a glass frit, a porous ceramic or a plastic. The protection pipe 322 contains a liquid reference electrolyte 314 that contains a given chloride concentration and has a potential sensing element 315 immersed in it, e.g. a silver wire coated with silver chloride. The reference electrolyte 314 may be thickened by a polymer, but is preferably still fluid. The protection pipe 321 at the opposite end of the diaphragm 322 is closed with an adhesion 323. A gas space is provided between the adhesion 323 and the reference electrolyte which serves to compensate thermally caused volume changes of the reference electrolyte 314. The potential sensing element 315 is led through the adhesion 323 and in an electrically conductive connection with the measure arrangement 304 via the contact point 316. As in the embodiment example described on the basis of FIG. 3, the measure arrangement 304 is designed to capture a potential difference between the potential sensing element 315 of the reference half cell 303 and the potential sensing element 308 of the measuring half cell 302 and output a respective measuring signal to a superior unit via an interface 319.

The housing created by the interior pipe 306 and the exterior pipe 311 contains a bridging electrolyte 320 which comprises an electrolyte thickened by a polymer, but still fluid, and hollow bodies 318 embedded in it and that surrounds the protection pipe 321, thus bringing the reference electrolyte 314 into electrolytic contact with the bridging electrolyte 320 via the diaphragm 322. The wall of the exterior pipe 311 features another diaphragm 313 which also may be made of an open-pore solid body and which brings the bridging electrolyte 320 into electrolytic contact with a measuring medium outside the housing. The housing of the reference half cell 303 is closed by an adhesive layer 312 bordering directly on the bridging electrolyte 320.

The bridging electrolyte 320 may be produced by introducing an electrolyte solution containing monomers and the hollow bodies 318 in a potassium chloride concentration of 3 mol/l with an initiator for polymerization of the monomers into the housing, and the polymerization in order to create a thickened, still fluid electrolyte is conducted. It is also possible to produce the bridging electrolyte 320 according to an alternative method as described in the context of FIG. 2 for the production of the reference electrolyte of the half cell represented in FIG. 2.

The invention claimed is:

1. An electrochemical half-cell, comprising:
 a housing;
 a potential sensing element, which is at least partially arranged inside the housing and connected electro-conductively with an electrical contact point outside the housing;
 an electrolyte arranged inside the housing; and
 a plurality of compressible hollow bodies, each hollow body having an elastic wall completely enclosing a gas-filled hollow space, wherein the plurality of hollow bodies is embedded in the electrolyte and distributed throughout a volume filled by the electrolyte.

2. The electrochemical half-cell according to claim 1, wherein the volume taken up in total by the hollow bodies is between 3 and 50% of the total volume taken up by the electrolyte and the hollow bodies embedded in it.

3. The electrochemical half-cell according to claim 1, wherein the hollow bodies contained in the half cell feature a size distribution in such a way that a maximum outer diameter of all hollow bodies is in a range of ±5 to ±30% around an average value of the maximum outer diameter of all hollow bodies and that the average value of the maximum outer diameter is a value between 10 nm and 1 mm.

4. The electrochemical half-cell according to claim 1, wherein the electrolyte is a solution thickened or solidified by means of a thickening agent.

5. The electrochemical half-cell according to claim 1, wherein the electrolyte includes a halide salt and a pH buffer system.

6. The electrochemical half-cell according to claim 1, wherein the electrolyte is produced by introducing an electrolyte solution containing monomers and a plurality of hollow bodies into the housing and by polymerization of the monomers in the housing to create a viscous electrolyte.

7. The electrochemical half-cell according to claim 1, wherein the electrolyte is a bridging electrolyte in contact with a reference electrolyte including a halide salt.

8. The electrochemical half-cell according to claim 1, wherein the housing includes an electrochemical junction arranged in a housing wall, which allows the electrolyte to be in electrolytic contact with a medium found outside the housing.

9. The electrochemical half-cell according to claim 1, wherein the housing is closed by means of an adhesive layer or a separation layer, wherein the volume filled by the electrolyte immediately borders on the adhesive layer or the separation layer.

10. The electrochemical half-cell of claim 1, wherein the electrolyte includes a polymer including at least one electrolyte salt.

11. The electrochemical half-cell of claim 1, wherein the wall is made of a polymer.

12. The electrochemical half-cell according to claim 1, wherein the volume taken up in total by the hollow bodies is between 5 and 10% of the total volume taken up by the electrolyte and the hollow bodies embedded in it.

13. The electrochemical half-cell according to claim 1, wherein the hollow bodies contained in the half-cell feature a size distribution in such a way that a maximum outer diameter of all hollow bodies is in a range of ±5 to ±15% around an average value of the maximum outer diameter of all hollow bodies, and that the average value of the maximum outer diameter is a value between 10 nm and 1 mm.

14. The electrochemical half-cell according to claim 1, wherein the electrolyte includes a halide salt.

15. The electrochemical half-cell according to claim 1, wherein the electrolyte includes a pH buffer system.

16. The electrochemical half-cell according to claim 1, wherein the electrolyte is produced by introducing an electrolyte solution containing monomers as well as a plurality of hollow bodies into the housing and by polymerizing the monomers in the housing to create a gelled electrolyte.

17. An electrochemical sensor comprising an electrochemical half-cell according to claim 1.

18. A method for producing the electrochemical half-cell as claimed in claim 1, the method comprising:
   providing the housing;
   introducing the electrolyte and the plurality of compressible hollow bodies into the housing; and
   introducing at least one section of the potential sensing element into the housing.

19. The method according to claim 18, wherein the electrolyte includes a thickening agent including at least one of the following: a polymer, a polymerizable monomer, and an interlinkable prepolymer.

20. The method according to claim 19, further comprising:
   thickening or solidifying the electrolyte contained in the housing by heating and/or irradiating the electrolyte until a thickened, but fluid or a solidified electrolyte is formed of the electrolyte into which the hollow bodies are embedded.

21. The method according to claim 20, wherein the electrolyte includes an interlinkable prepolymer, and the thickening or solidifying of the electrolyte occurs by interlinking the prepolymer, wherein the thickening or solidifying includes heating and/or irradiating the electrolyte and adding a crosslinker to the electrolyte.

22. The method according to claim 20, wherein the electrolyte includes one or several polymerizable monomers, and the thickening or solidifying of the electrolyte occurs by polymerization, wherein the thickening or solidifying includes heating and/or irradiating the electrolyte and adding an initiator to the electrolyte.

23. The method according to claim 20, wherein a viscosity and/or a density of the electrolyte is adjusted by means of an additive depending on a mass and a geometry of the hollow bodies so that the hollow bodies and the electrolyte may not significantly segregate during the thickening or solidifying of the electrolyte.

* * * * *